United States Patent [19]

Ueno et al.

[11] 4,067,658

[45] Jan. 10, 1978

[54] APPARATUS FOR HOLDING KNOBS

[75] Inventors: Yoshinobu Ueno, Kanagawa; Tadayoshi Shibata, Fujisawa, both of Japan

[73] Assignee: Matsushita Electric Industrial Co., Ltd., Osaka, Japan

[21] Appl. No.: 623,505

[22] Filed: Oct. 17, 1975

[30] Foreign Application Priority Data

Oct. 30, 1974 Japan .......................... 49-131888[U]

[51] Int. Cl.2 ................................................ F16C 3/10

[52] U.S. Cl. .................................... 403/357; 403/372; 74/553

[58] Field of Search ............... 403/354, 356, 361, 372, 403/357; 16/121, 118; 74/553, 548; 292/349, 355, 348

[56] References Cited

U.S. PATENT DOCUMENTS

| | | | |
|---|---|---|---|
| 2,153,950 | 4/1939 | Whinery | 403/357 |
| 2,291,560 | 7/1942 | Rhodes | 403/357 |
| 2,363,194 | 11/1944 | Nirdlinger | 403/359 |
| 3,182,345 | 5/1965 | Smith | 403/361 X |
| 3,193,312 | 7/1965 | Ehner | 74/553 X |
| 3,311,393 | 3/1967 | Leitmann | 292/353 X |
| 3,386,306 | 6/1968 | Kenyon | 74/548 |
| 3,430,994 | 3/1969 | Keeler | 403/372 |

*Primary Examiner*—Andrew V. Kundrat
*Attorney, Agent, or Firm*—Stevens, Davis, Miller & Mosher

[57] ABSTRACT

Disclosed is an apparatus for holding knobs for turning a channel selector of a television receiver or for similar purposes. A flat plate having a first group of projections adapted to bear against a notched flat portion of a rotatable shaft (tuner shaft) having a semi-circular section, and a second group of projections arrayed to bear against a portion of knob into which the shaft is inserted is employed to obtain a reliable coupling of the shaft and the knob.

4 Claims, 17 Drawing Figures

APPARATUS FOR HOLDING KNOBS

The present invention relates to a holder apparatus for coupling together a rotatable shaft having a portion of a semi-circular cross-section and a knob such as that used for turning a channel selector of a television receiver.

An object of the invention is to provide a knob holding apparatus which eliminates back-lash upon rotation of the selecting knob.

Another object of the invention is to provide an inexpensively and easily manufactured knob holding means which can be produced on a mass production basis by, for example, an integral molding method.

Still another object of the invention is to provide a knob holding apparatus having excellent durability in which the holding force exerted on the knob and the rotatable shaft is not subjected to deterioration even after a long period of use.

Figure 3A:
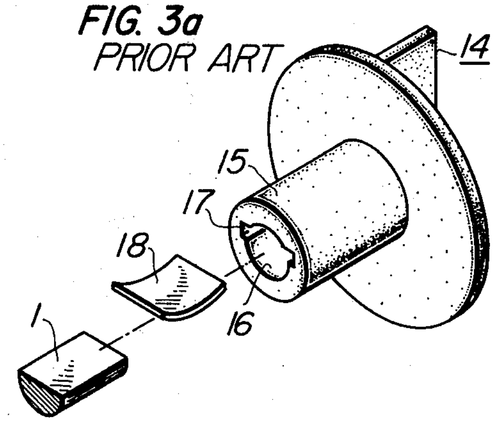
FIG. 3a PRIOR ART
Figure 3B:
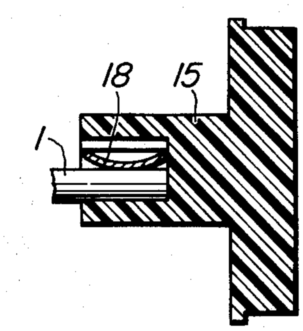
FIG. 3b PRIOR ART
Figure 4A:
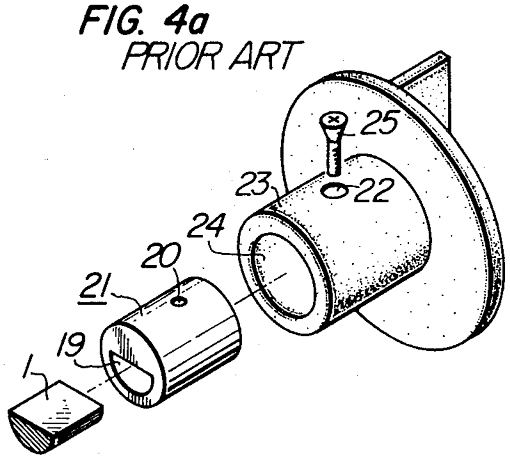
FIG. 4a PRIOR ART
Figure 4B:
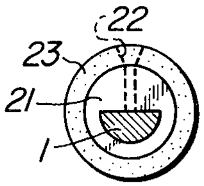
FIG. 4b PRIOR ART
Figure 5:
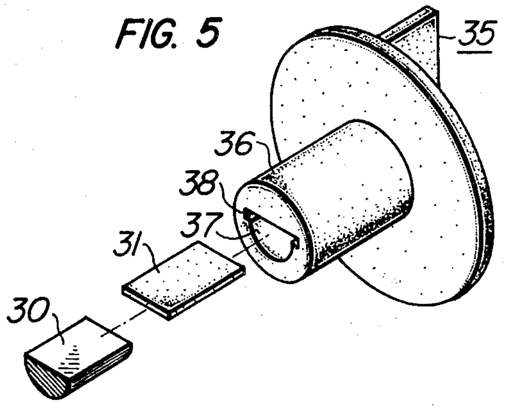
Figure 6:
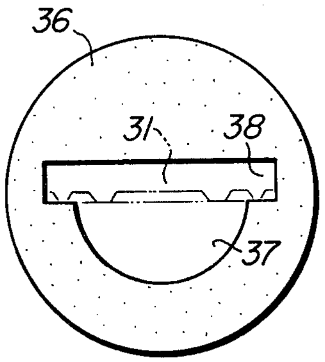
Figure 7A:
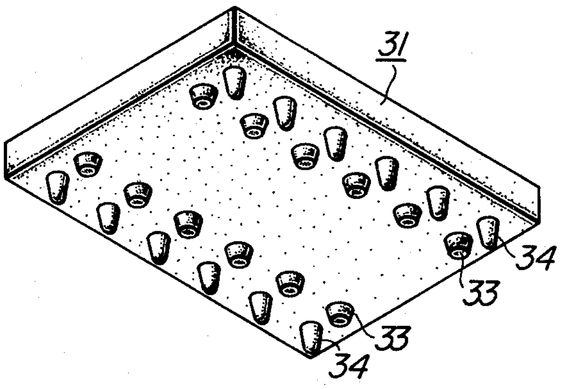
Figure 7B:
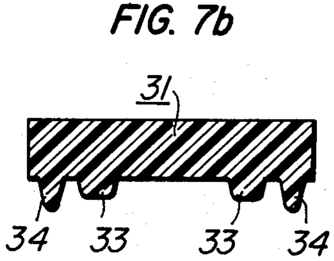
Figure 8:
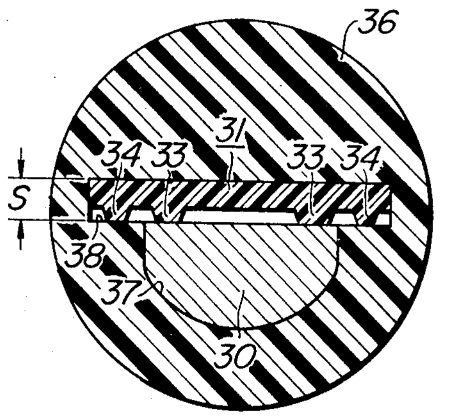
Figure 9:
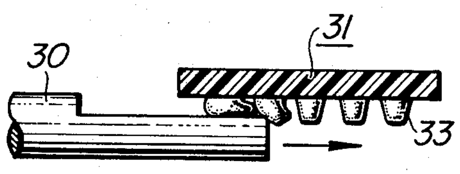
Figure 10A:
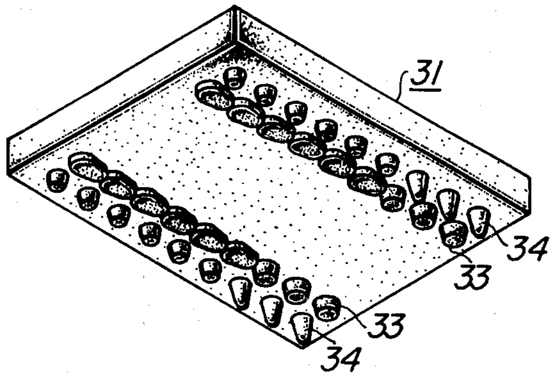
Figure 10B:
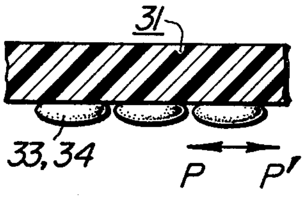
Figure 11:
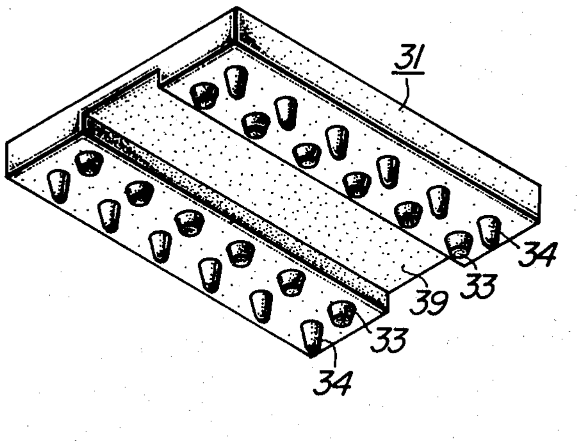

The above and other objects as well as novel features and the advantages of the invention will become more apparent from the following description made with reference to the drawings, in which FIGS. 1*a*, 2*a*, 3*a* and 4*a* show hitherto known knob holding apparatus in exploded perspective views, and FIGS. 1*b*, 2*b*, 3*b* and 4*b* show the same holding apparatus in the respective operative or holding states in cross-sectional views, FIG. 5 is an exploded perspective view of an embodiment of the knob holding apparatus according to the invention, FIG. 6 shows in a cross-sectional view a main portion of the knob employed in the knob holding apparatus shown in FIG. 5, FIG. 7*a* shows in a perspective view a flat plate of a synthetic resin material for use in the apparatus shown in FIG. 5, FIG. 7*b* is a cross-sectional view of the same, FIG. 8 is a sectional view showing the apparatus shown in FIG. 5 in an inserted operative position, FIG. 9 illustrates a distortion in the configuration of the synthetic resin flat plate produced upon the insertion of a tuner shaft, FIG. 10*a* shows the synthetic resin flat plate after having been used in a perspective view, FIG. 10*b* is a fragmentary side view of the flat plate shown in FIG. 10*b*, and FIG. 11 shows in a perspective view another embodiment of the flat plate of a synthetic resin material for use in the knob holding apparatus according to the invention.

Before entering into a description of the preferred embodiments of the invention, hitherto known knob holding apparatus or holders will first be described to provide a better understanding of the invention.

Figure 1A:
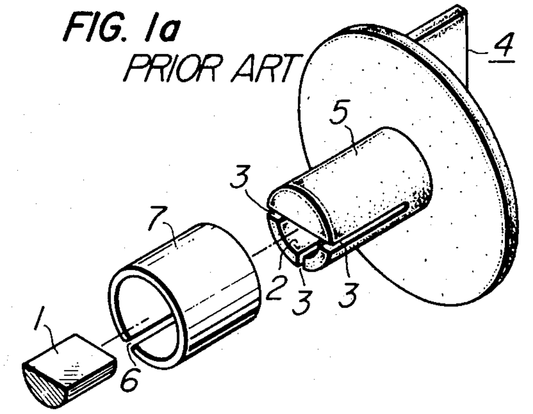
FIG. 1a PRIOR ART
Figure 1B:
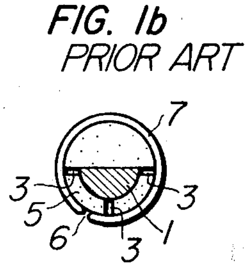
FIG. 1b PRIOR ART

Referring to FIG. 1*a*, reference numeral 1 indicates a rotatable shaft having an end portion of substantially semi-circular cross-section, while numeral 4 denotes a knob body having a hub sleeve 5 which defines therein an axial bore 2 for receiving and holding the rotatable shaft 1 and a plurality of notched grooves 3 formed axially and communicated with the socket bore 2. Reference numeral 7 denotes an annular metal spring having an axially formed split 6.

In the arrangement of the conventional apparatus described above, the knob body 4 is mounted and held resiliently by the rotatable shaft 1 by inserting the shaft 1 into the holding bore 2 of the knob 4 after the annular metal spring 7 has been fitted around the outer periphery of the hub 5.

It will be noted that the use of the resilient annular metal spring 7 is intended to facilitate insertion of the rotatable shaft 1 into the holding bore 2 and to absorb or compensate for the dimensional errors of the rotatable shaft 1. However, with such arrangement, the diameter of the hub 5 tends to be enlarged under the influence of stress due to the rotational torque of the rotatable shaft 1 and the hub 5 of the knob 4 upon the rotation of the knob 4, as a result of which the phenomenon of back-lash will undesirably occur at the instant when the rotation of the knob 4 is stopped. Further, there arises the disadvantageous possibility that the withdrawal of the rotatable shaft 1 from the holding bore 2 will be accompanied by the simultaneous removal of the annular metal spring 7.

Figure 2A:
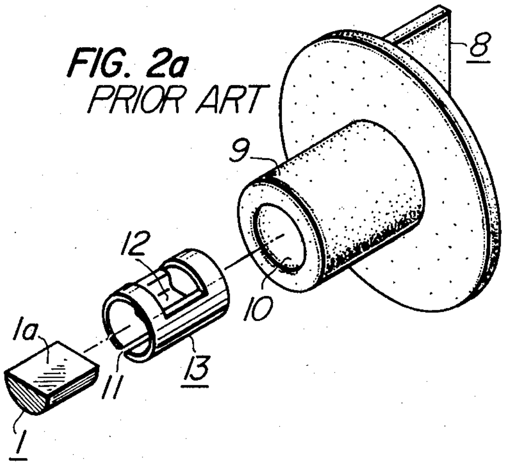
FIG. 2a PRIOR ART

Referring to FIG. 2*a* which shows a holding structure also of the prior art, reference numeral 8 indicates a knob body having a projecting hub 9 which defines therein an axial bore 10 for receiving a rotatable shaft 1 having a notched flat end portion 1*a*. Numeral 13 designates an annular metal spring formed with an axial groove 11 and additionally a recess or concaved portion 12 at the side which abuts the flat end portion 1*a* of the rotatable shaft 1.

Figure 2B:
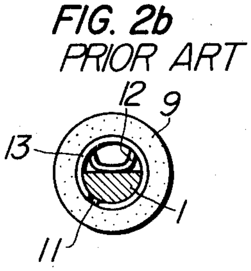
FIG. 2b PRIOR ART

Upon assembling, the annular metal spring 13 is inserted into the holding bore 10 and thereafter the rotatable shaft 1 is inserted into the annular spring 13, whereby the knob body 8 is held resiliently by the rotatable shaft (FIG. 2*b*).

In the case of the above mentioned holding structure, the secured fitting of the knob onto the rotatable shaft 1 is also effected by utilizing the resiliency of the annular metal spring 13, which results in the occurrence of back-lash as well as the simultaneous removal of the annular spring 13 upon the withdrawal of the rotatable shaft 1, as is in the case of the arrangement shown in FIG. 1*a*.

In FIG. 3*a* which shows another known holding structure of a manipulating knob, the knob 14 has a hub 15 formed axially with a receiving bore 16 for a rotatable shaft 1 and a bore 17 for accommodating therein a metal leaf spring 18 having a curved profile.

It will be easily appreciated that, upon assembling, the rotatable shaft 1 is inserted into the holding bore 16, while the metal leaf spring 17 is disposed in the bore 17, whereby the knob 14 is press-held by the rotatable shaft 1 under the resilient pressure exerted by the metal leaf spring 18 (FIG. 3*b*).

It is noted that the above arrangement of the knob holding structure also can not avoid the drawback that the back-lash may occur as in the case of the structures described hereinbefore in conjunction with FIGS. 1*a* and 2*a*, since the resiliency of the metal leaf spring 18 is utilized for holding the knob on the rotatable shaft 1.

It will thus be understood that the use of the metal springs, such as 7, 13 and 18, for absorbing possible dimensional errors of the rotatable shaft 1 through the resiliency of these springs in turn gives rise to disadvantageous occurrence of the back-lash.

FIG. 4*a* shows a holding structure for a manipulating knob which has also heretofore been known and in which no metal spring is employed. In the drawing, reference numeral 21 indicates a holding member of a metallic material which is formed with an axial through-bore 19 and a threaded bore 20 extending perpendicularly to the bore 19. Numeral 23 denoted a hub integrally formed with the knob body and having a threaded bore 22 lined with the bore 20 and a socket bore 24.

The metallic holding member 21 is adapted to be inserted into the socket bore 24. Subsequently, the rotatable shaft 1 is inserted into the bore 19 in place and set screws 25 are screwed into the bores 22 and 20. The hub 23 of the knob is thereby secured to the rotatable shaft 1.

With the arrangement described above, the insertion as well as the removal of the shaft may certainly be facilitated without involving occurrence of back-lash. However, since the set screws 25 have to be tightened or loosened each time the shaft 1 is inserted or removed, the assembling operation is troublesome and time-consuming. Besides, in order to prevent the screws 25 from being inadvertently loosened due to vibratory forces produced upon the rotation of the knob, it is necessary to provide an anti-loosening means such as application of a suitable bonding agent, which means the requirement of additional costs and labor.

In the cases where the metallic spring is employed, the characteristics of such spring inducing the dimension, surface treatment such as quenching and annealing or the like provide important factors which require a high grade quality control of the springs. Further, the holding structures of the prior art as described above incur high manufacturing costs. Besides, it has been observed from a use life test that the springs are easily deformed and the holding force thereof is progressively decreased remarkably, as a result of which the durability of the springs is deteriorated.

An important object of the present invention is therefore to eliminate the disadvantages of the hitherto known holding apparatus such as those described above.

Now, the invention will be described with reference to FIGS. 5 to 11 which show preferred embodiments of the invention. In FIGS. 5 to 7, numeral 30 denotes a rotatable shaft having an end portion of a semi-circular cross-section. Reference numeral 31 indicates a flat plate of a synthetic resin material such as polyethylene, polypropylene or the like which is integrally provided with first and second groups of projections 33 and 34 at one surface, as can be clearly seen from FIG. 7. The projections in the first group 33 are arrayed along a straight line with a constant space maintained between the adjacent projections. The second group of projections 34 is located nearer to the edges of the flat plate than the first group 33 and comprises a number of projections arrayed linearly with a constant space between the adjacent projections as is in the case of the first group 33. It is further to be noted that each projection of the first group 33 is of a truncated conical configuration. On the other hand, each of the projections of the second group is of a substantially conical configuration as viewed in the vertical section and has a height greater than that of the projection of the first group 33. Numeral 35 indicates a knob body having a hub 36 which defines therein a holding bore 37 to receive the rotatable shaft 30 and a bore 38 formed contiguously to the bore 37 to receive a flat plate 31 of synthetic resin, as can be clearly seen from FIG. 6.

FIG. 8 shows in a cross-sectional view the assembled structure in which the synthetic resin flat plate 31 is inserted in the associated holding bore 38 and the rotatable shaft 30 is disposed within the bore 37. It will be noted that the first group of projections 33 of the flat plate 31 are pressed against the notched flat portion of the rotatable shaft 30, thereby to sustain the shaft 30 within the holding bore 37. In this connection, the height, diameter, locations, the number of the projections of the first group 33 as well as the number of the rows or linear arrays thereof should be so selected that, for the conceivable minimum dimensional error of the rotatable shaft 30, no rattling should occur between such shaft, as inserted, and the holding bore. More specifically, the above geometrical factors should be so determined that, upon the insertion of the shaft 30, the first group of projections 33 may be deformed to such degree that the adjacent projections are abutted with one another as is shown in FIG. 9, so far as the dimensional error of the shaft 30 falls within a range of allowable tolerance. This feature is very important from a viewpoint that any further deformation of the projections in the first group must be inhibited even when the rotational torque of the shaft 30 is applied to the projections deformed to the degree as above described. In other words, when the geometrical factors have been determined in the above described manner, the projections deformed to such degree that the adjacent projections come into contact with one another and any further deformation of the projections in the inserting direction is inhibited, whereby rattling between the holding bore 37 and the rotatable shaft 30 as well as back-lash of the latter can be effectively prevented. Furthermore, due to the feature that the adjacent projections are so deformed as to contact one another, the rotatable shaft 30 is fixedly supported through the so-called surface contact, which allows a decreased rotational torque for a unit area and increases the durability of the holding structure. For example, the holding apparatus according to the invention can be effectively used for a long life corresponding to several ten thousand rotations of the shaft 30.

In case the dimensional error of the shaft 30 amounts to the maximum limit of the tolerance range, projections 33 of the first group will then be subjected to a greater deformation upon the insertion of the shaft 30. However, such deformation will mainly occur in the direction of the insertion as indicated by arrow p-p′ in FIG. 10*b* so that it facilitates the insertion of the shaft 30. Of course, the deformation of the projections will occur in the direction perpendicular to the inserting direction.

The projections 34 of the second group serve to reinforce the fitting engagement between the hub 36 of the knob and the flat plate 31 of a synthetic resin material. The second group of projections 34 is effective to compensate dimensional errors in the height S of the bore 38 (see FIG. 8) and the thickness of the flat plate 31 itself by virtue of the deformation of the projections 34 of the second group. Additionally, the second group of projections 34 serves to prevent the synthetic resin plate 31 from being drawn from the bore 38 when the knob 35 is rotated or removed from the shaft 30.

As will be appreciated from the foregoing description, the main function of the flat plate 31 of a synthetic resin material according to the invention is to hold the knob 35 on the rotatable shaft 30. Since the height of the second group of projections 34 is selected greater than that of the projections 33 of the first group as hereinbefore described, the latter undergoes less deformation as compared with the former. However, since the projections 33 of the first group is of a truncated conical configuration, these projections exhibit a relatively high resilient stress to the deformation and exert a great holding force on the rotatable shaft 30 due to the surface contact. On the other hand, the projections 34 of the second group are subjected to a greater deformation as compared with the second group of the projections 33. However, because of the conical configuration thereof, the projections 33 exhibit less resilient stress to the deformation. By virtue of these features, the insertion of the flat plate 31 of synthetic resin can be easily effected. However, withdrawal of the once inserted flat plate 31 from the holding bore 38 can only be accomplished with great difficulty since the second group of projections 34 has been subjected to a greater deformation. When the stress due to the deformation of the first group of projections 33 is compared with that of the second projections, the stress of the former is slightly greater than the latter. In this way, the above described holding structure according to the invention permits in the most reasonable manner the reliable holding of the rotatable shaft 30 and assures prevention of the removal of the flat plate 31 from the associated bore 38, thus providing a great utility in practical applications.

In the above described embodiment, the surface treatments such as quenching and annealing can be completely omitted since the flat plate 31 of a synthetic resin material having a unique configuration as above mentioned is used in place of the metallic springs of the prior art. Further the flat plate 31 according to the invention can be molded integrally on a mass production scale thereby greatly reducing the manufacturing costs of the holding structure.

It will further be noted that, due to the provision of the first group of projections 33 abutting against the notched flat portion of the rotatable shaft 30 under pressure and the second group of projections 34 adapted to pressingly abut against an inner wall of the hub 36 of the knob, a secured fitting of the rotatable shaft in the hub 36 of the knob can be accomplished. Besides, the dimensional errors of the shaft 30, the holding bore 37 formed in the hub 36 or the like parts can be compensated by the deformations of the projections 33 and 34, whereby a secured fitting condition can be constantly maintained without the occurrence of back-lash.

Moreover, according to the invention, the second group of the projections 34 is so dimensioned that they have greater height than that of first group of projections 33 and have tapered projecting ends. This aspect of the invention contributes to the effective fitting and removal of the rotable shaft 30 into and from the hub 36 of the knob.

With respect to the inserting and holding force, it has been observed that a sufficient holding support can be assured by the fact that the shaft 30 is supported by the deformed surfaces of the projections 33 and 34 of the first and the second groups. Additionally, by selecting the geometrical factors such as the position, number, row number and shapes of the projections such that the initial deformation thereof may not be further enlarged, it is possible to maintain the holding force approximately equal to that available at the initial state even after a long life test in which the device is rotated.

For example, in a durability test in which the shaft 30 is repeatedly inserted and removed, it has been found that, in the case of the structure shown in FIGS. **3*a* and 3*b* employing the metallic leaf spring 18, the inserting and holding force amounting to 6 to 9 kg in the first test cycle decreased to 3 to 4 kg at the twentieth test cycle. In contrast thereto, the inserting and holding force of 7 to 10.5 kg at the initial test cycle decreased only to 5 to 7 kg at the twentieth test cycle in case of an embodiment of the invention. With respect to the durability of the holding structure as measured by the rotation test, the apparatus shown in FIG. 3** which had the inserting and holding force of 7 to 10 kg at the initial test cycle deteriorated to an unusable degree after about ten thousand rotations. On the other hand, in an embodiment of the invention, the same force has been about 7 to 12 kg at the initial rotation test and decreased to 3.5 to 6.5 kg after ten thousand rotations and to 3 to 6 kg after one hundred rotations.

FIG. 11 shows another embodiment of the flat plate 31 according to the invention, in which concave portion 39 extending in the inserting direction is formed between the rows of the projections 33 in the first group. The concave portion 39 provides an escape space for the first group of projections 33 deformed by the inserted shaft 30. This arrangement is advantageous when the dimensional error of the rotatable shaft 30 is on the order of a maximum limit of the allowable tolerance range, giving rise to considerable deformation of projections 33 in the first group.

It goes without saying that the holding apparatus according to the invention can be applied to the mounting of knobs of various electronic devices, other than knobs for the channel selecting devices of television receivers. Further, the invention is not restricted to the disclosed embodiments. For example, a pyramidal configuration of the projection may be employed in place of the conical configuration.

The invention can be also realized by using a flat plate of a synthetic resin material having no projections.

What is claimed is:

1. Apparatus for holding a knob to a shaft having a notched flat portion comprising:

a flat plate made of a synthetic resin material; and a knob body receiving said shaft and said flat plate, said flat plate being positioned between said knob body and said notched flat portion of said shaft, and having integrally therewith first and second groups of resilient projections which are effective to press against said flat portion of said shaft and against said knob.

2. Apparatus as set forth in claim 1, wherein said knob body is provided with a first bore for receiving said shaft and a second bore for receiving said flat plate, said flat plate having said first group of projections positioned in a space defined by said notched flat portion of said shaft and the internal wall of said second bore, and said second group of projections positioned in the remaining space defined by the internal wall of said second bore.

3. Apparatus as set forth in claim 2, wherein the height of the second group of projections of said flat plate is greater than that of the first group of projections.

4. Apparatus as set forth in claim 1, wherein said flat plate is formed with a concave portion in the surface thereof, said first and second groups of projections being formed in said surface, said concave portion providing an escape space for deformed portions of said projections upon the deformation thereof.

* * * * *